July 2, 1929.

M. SPITZER

PACKING BOX

Re. 17,351

Original Filed Nov. 18, 1927

INVENTOR

Maurice Spitzer

BY

Arthur S. Kent his ATTORNEY

Reissued July 2, 1929. Re. 17,351

UNITED STATES PATENT OFFICE.

MAURICE SPITZER, OF NEW YORK, N. Y., ASSIGNOR TO RINKLEPROOF BOX CO., INC., A CORPORATION OF NEW YORK.

PACKING BOX.

Original No. 1,681,199, dated August 21, 1928, Serial No. 234,064, filed November 18, 1927. Application for reissue filed October 12, 1928. Serial No. 312,223.

This invention relates to packing boxes for garments, and aims to provide a simple and inexpensive means for insuring dresses and other garments against becoming mussed during transportation in boxes.

Great difficulty has heretofore been experienced by dress manufacturers in packing dresses so that they will not become badly mussed in transportation. The dresses are usually packed in flat cardboard boxes of a size to hold a number of dresses and of a length considerably less than that of a dress. The dresses are folded lengthwise and placed in the box one on top of another. Attempts have been made to prevent mussing of the dresses by tying them down after packing, but these have proved ineffective. More success has been obtained by folding each dress over a stiff piece of cardboard, but this plan is not entirely effective, and cuts down the capacity of the box and has other disadvantages.

Figure 1:
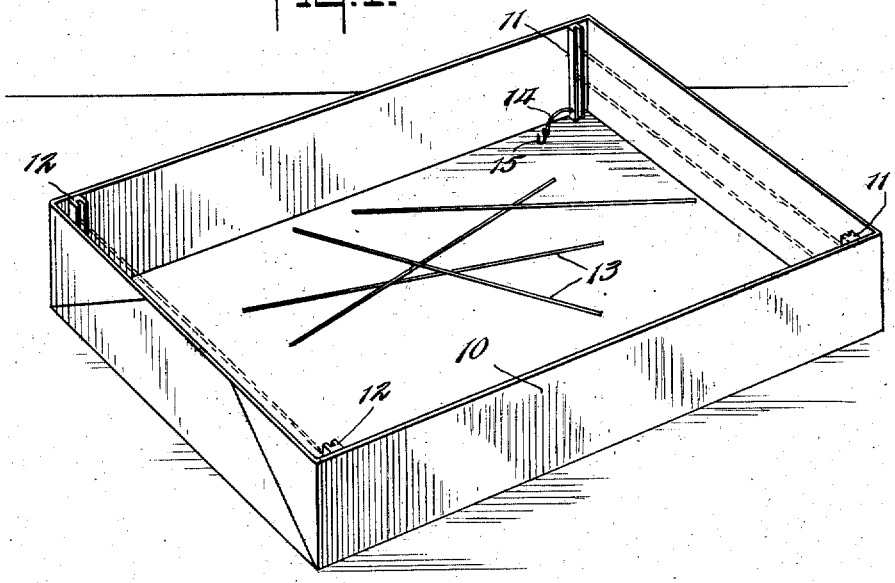
Figure 2:
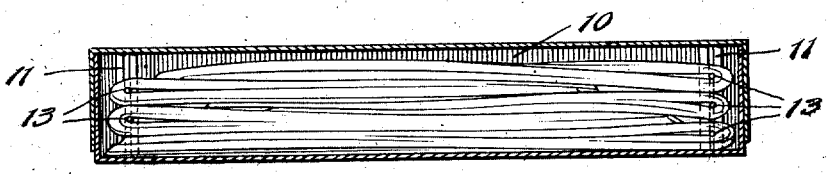
Figure 3:
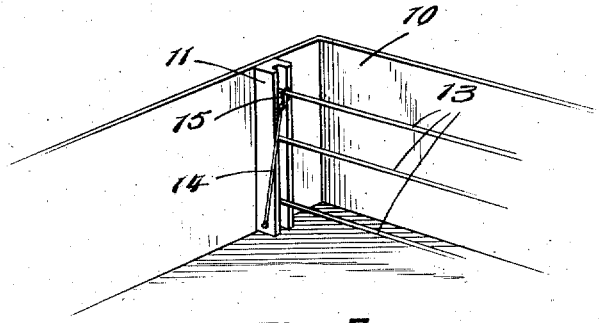

In accordance with the present invention, the dresses are held securely in position by a plurality of slidably mounted removable rods over which they are folded. In order that the invention may clearly be understood, I will describe in detail a specific embodiment of it which is shown in the accompanying drawings in which:

Fig. 1 is a perspective view of a box embodying the invention;

Fig. 2 is a longitudinal section of the box after the dresses or other garments have been packed in it and the cover has been applied, the thickness of the dresses being materially exaggerated for the purpose of illustration; and Fig. 3 is a perspective view of one corner of the box illustrating the position of the rods and rod-holder after the dresses have been packed, but omitting the dresses themselves.

The box 10 shown in the drawings may be made of cardboard like the packing boxes heretofore used for ladies' dresses or of other suitable material. In accordance with the invention, this box is provided with two pairs of open slideways 11, 12 which are secured to the side walls of the box at a short distance from each end wall thereof. The slideways 11, 12 may consist merely of grooved strips of wood or other suitable material which may be glued or otherwise secured to the pasteboard walls of the box. A plurality of rods 13 are provided for each pair of slideways. The rods are of such length that their ends may be inserted in a pair of the slideways from above. This leaves each rod free to move vertically, but prevents it from moving lengthwise of the box. The rods may be of any suitable material and of any desired cross-section. I consider round rods, such as wooden dowel sticks, most suitable.

In packing the box, the first dress, or other garment, is laid out flat on the bottom of the box and extending over one end of the box. One of the rods 13 is then placed in the pair of slideways near that end of the box, and the extending portion of the dress is folded over this rod. The rod thus prevents the fold of the dress from moving away from that end of the box. The next dress is then placed in the box in the same manner, except that it overhangs the other end of the box and is folded over a rod placed in the other pair of slideways. The box may thus be filled completely with dresses, each of which has its fold held against movement so that it cannot become mussed. When the box has been completely filled, the rods as well as the dresses may be held in position by placing a cover on the box and tying or otherwise securing it in position.

In order to hold the dresses in position when the box is not completely filled, or when the cover is not tied on, resilient means are most desirably provided to urge the uppermost rod in each pair of slideways downward. In the form shown, such means consist of elastic bands 14 secured to the lower ends of the slideways 11, 12, and each provided with a hook 15 which may be placed over the upper rod as shown in Fig. 3. In drawing down the upper rods in each pair of slideways, the elastic bands 14 effectively hold down all the rods and the dresses which are folded over them.

What I claim is:

1. A packing box for garments having a pair of open slideways on its sides near each of its ends, and a plurality of rods adapted to be inserted in each pair of slideways from their upper ends so that each dress may be folded over a rod as the box is packed.

2. A packing box for garments having a pair of open slideways on its sides near each of its ends, a plurality of rods adapted to be inserted in each pair of slideways from their upper ends so that each dress may be folded over a rod as the box is packed, and resilient means for urging the upper rod in each pair of slideways downward to hold the dresses firmly in position even when the box is not filled to its capacity.

3. A packing box for garments have a pair of slideways at its sides near each of its ends, and a plurality of rods adapted to be inserted in each pair of slideways so that each garment may be folded over a rod as the box is packed.

In testimony whereof, I have hereunto set my hand.

MAURICE SPITZER.